United States Patent [19]

Szita et al.

[11] 3,948,840

[45] Apr. 6, 1976

[54] AQUEOUS SOLVENT FOR HALOGEN-CONTAINING ACRYLONITRILE POLYMER

[75] Inventors: Jeno G. Szita, Norwalk; Arutun Maranci, Westport, both of Conn.

[73] Assignee: American Cyanamid Company, Stamford, Conn.

[22] Filed: Apr. 10, 1974

[21] Appl. No.: 459,507

[52] U.S. Cl. ... 260/29.6 AB; 260/29.6 AN; 264/182
[51] Int. Cl.² .......................................... C08L 33/20
[58] Field of Search ............ 260/29.6 AN, 29.6 AB; 252/182

[56] References Cited
UNITED STATES PATENTS

| | | | |
|---|---|---|---|
| 2,716,093 | 8/1955 | McClellan | 260/29.6 |
| 3,313,758 | 4/1967 | Apperson et al. | 260/29.6 AN |
| 3,632,543 | 1/1972 | Nakanome et al. | 260/29.6 AN |
| 3,773,884 | 11/1973 | Shimosaka et al. | 260/29.6 AN |
| 3,776,142 | 12/1973 | Nield et al. | 260/29.6 AN |

*Primary Examiner*—H. S. Cockeram
*Attorney, Agent, or Firm*—Philip Mintz

[57] ABSTRACT

Aqueous solutions containing at least 30% sodium thiocyanate and 2 to 25% dipropylene glycol are solvents for acrylonitrile polymers containing 55 to 80% acrylonitrile and 15 to 40% vinyl chloride, vinyl bromide, vinylidene chloride, vinylidene chlorobromide, and/or vinylidene bromide useful in forming solutions of 8 to 15% of such polymers for wet-spinning into fibers.

6 Claims, No Drawings

AQUEOUS SOLVENT FOR HALOGEN-CONTAINING ACRYLONITRILE POLYMER

This invention relates to wet-spinning fibers of acrylonitrile polymer containing substantial concentrations of halogen-containing comonomer therein using concentrated aqueous solution of sodium thiocyanate as solvent for the polymer. More particularly, this invention relates to suitably modifying such solvent so it will satisfactorily dissolve such polymer to form a clear solution, free of undissolved particles or gels, capable of being wet-spun to form fibers.

In order to improve the fire-retardancy of fabrics made from fibers of acrylonitrile polymer, it is known to incorporate in the acrylonitrile polymer a substantial concentration, e.g., 15 to 40% on weight of polymer, of at least one halogen-containing ethylenically unsaturated comonomer, such as vinyl chloride, vinyl bromide, vinylidene chloride, vinylidene bromide, or vinylidene chlorobromide. These polymers are soluble in dimethylformamide and dimethylacetamide and can be spun into fibers from solutions therein. Unfortunately, these polymers cannot be suitably dissolved in concentrated aqueous sodium thiocyanate solutions to form clear solutions, free of undissolved particles or gels, capable of being wet-spun to form fibers. In view of the many desirable attributes of concentrated aqueous sodium thiocyanate solutions as solvents for acrylonitrile polymers, and of wet-spinning processes using such salt solutions as solvents, and of the acrylonitrile polymer fibers so produced, it is an object of the present invention to discover how to dissolve acrylonitrile polymers containing 55 to 80% acrylonitrile and 15 to 40% of such halogen-containing ethylenically unsaturated comonomers using concentrated aqueous sodium thiocyanate solution as solvent to form a polymer solution suitable for wet-spinning.

It is a further object of this invention to discover an additive which may be added to the concentrated aqueous sodium thiocyanate solution to convert it into a suitable solvent for such acrylonitrile polymers so they can be wet-spun. It is a still further object of this invention to do so using additives which are inexpensive, readily available, recyclable, non-toxic, non-volatile, and which do not create hazards of fire or explosion in the manufacturing plant. In accordance with this invention it has been discovered that dipropylene glycol is such a unique additive. More particularly, it has now been discovered that an aqueous solution of at least 30%, and preferably 40 to 55%, of sodium thiocyanate and 2 to 25% dipropylene glycol is an excellent solvent for acrylonitrile polymers containing 55 to 80% acrylonitrile and 15 to 40% of such halogen-containing ethylenically unsaturated comonomer, which solvent is suitable for preparing solutions containing 8 to 15%, and preferably 10 to 13%, of such polymer useful for wet-spinning to form fibers.

The acrylonitrile polymers with which the present invention is concerned contain 55 to 80% acrylonitrile and 15 to 40% halogen-containing comonomer (to impart flame-retardant characteristics to fibers and textiles made therefrom), which comonomer is vinyl chloride, vinyl bromide, vinylidene chloride, vinylidene chlorobromide, or vinylidene bromide or mixtures thereof. These acrylonitrile polymers may, and usually do, contain minor amounts, such as up to about 10%, of other comonomers for purposes well-known in the art, such as for dyesites, for improving textile properties, for improving dyeability, etc. Illustrative of such other comonomers are those mentioned in U.S. Pat. Nos. 3,040,008 and 2,777,751, one or more of which may be incorporated in the acrylonitrile polymers useful in the practice of this invention. These acrylonitrile polymers may be formed by any of the conventional emulsion or suspension polymerization processes using free-radical generating catalysts or ultraviolet radiation to produce polymers of fiber-forming molecular weights.

These acrylonitrile polymers do not satisfactorily dissolve in concentrated aqueous sodium thiocyanate solutions to produce useful spinning solutions regardless of sodium thiocyanate concentration. In accordance with the present invention, the use of dipropylene glycol in such concentrated aqueous sodium thiocyanate solutions converts them to useful solvents for such polymers. The dipropylene glycol is used at a concentration of 2 to 25% on weight of solvent in concentrated aqueous sodium thiocyanate solution containing at least 30%, and preferably 40 to 55%, sodium thiocyanate on weight of solvent. Spinning solutions, containing 8 to 15%, and preferably 10 to 13%, of such polymer dissolved in this solvent, can be prepared by any of the conventional methods for preparing aqueous salt solutions of acrylonitrile polymers. Particularly useful are those disclosed in U.S. Pat. Nos. 2,605,246 and 3,531,557. One such procedure is to disperse the polymer in an aqueous solution of sodium thiocyanate, with or without dipropylene glycol, of a salt concentration below about 30% and then to increase the salt concentration and the dipropylene glycol concentration while agitating the slurry, with or without heating, to effect solution. Other procedures may also be used. These spinning solutions, which may also contain other additives, such as dyes, pigments, delusterants, antimony oxide, etc., are useful for wet-spinning to form fibers by conventional wet-spinning procedures and apparatus.

That dipropylene glycol should be capable of converting concentrated aqueous sodium thiocyanate solutions into satisfactory solvents for these acrylonitrile polymers is quite surprising since such closely related additives as ethylene glycol, diethylene glycol, and dioxane disclosed in U.S. Pat. No. 2,716,093 do not assist in making satisfactory spinning solutions from these acrylonitrile polymers.

EXAMPLE 1

An acrylonitrile polymer containing 62% acrylonitrile, 25% vinylidene chloride, 8.1% vinylidene bromide, and 4.9% methyl methacrylate was prepared by slurry polymerization using a redox catalyst comprising sodium chlorate and sodium metabisulfite. This polymer was insoluble in all concentrations of aqueous sodium thiocyanate up to the saturation limit of about 60% salt.

An aqueous solution of 50% sodium thiocyanate, 40% water, and 10% dipropylene glycol was prepared. The above-described polymer was found to be soluble in this aqueous solution and an acrylonitrile polymer spinning solution containing 8.4% polymer and 91.6% solvent was prepared. The polymer solution was a clear viscous liquid suitable for wet-spinning into fibers.

EXAMPLE 2

An aqueous solution of 50% sodium thiocyanate, 40% water, and 10% dioxane was prepared. 8.4 parts of the polymer of Example 1 was dispersed into 91.6 parts of this solution. A clear solution was not obtained, and, on standing at room temperature, it became a solid gelled mass which could not be spun.

EXAMPLE 3

A polymer solution was prepared by dissolving 9.3 parts of the polymer of Example 1 in 90.7 parts of an aqueous solution of 45% sodium thiocyanate, 31.5% water, and 23.5% dipropylene glycol. A clear, completely dissolved, viscous solution, suitable for wet-spinning was obtained.

EXAMPLE 4

Example 3 was repeated in every detail except that dioxane was used in place of dipropylene glycol. The polymer did not dissolve completely and became gelled on standing. It was not useful for spinning into fibers.

EXAMPLE 5

An acrylonitrile polymer containing 66.6% acrylonitrile, 28.0% vinylidene chloride, and 5.4% acrylamide was prepared by slurry polymerization using a redox catalyst comprising sodium chlorate and sodium metabisulfite. This polymer was insoluble in all concentrations of aqueous sodium thiocyanate. A series of solutions was prepared, each of which contained 77.4 grams (43.0%) sodium thiocyanate, 64.0 grams (35.6%) water, and 38.6 grams (21.4%) of an additive identified in the following table. In each of the tests reported in the following table, 20 grams of the polymer of this example were dispersed in 180 grams of the aqueous sodium thiocyanate solution containing an additive. The dispersions were heated with stirring for ½ hour at 60°C. and then cooled to room temperature. The conditions observed are reported in the following table.

Table

| Test No. | Additive | Conditions Observed | |
|---|---|---|---|
| | | at 60°C. | at Room Temp. |
| 5A | Dipropylene Glycol | Clear Solution | Clear Viscous Solution |
| 5B | Dioxane | Dissolved | { Gelled Solid with <br> { Crystallized salt |
| 5C | Diethylene Glycol | Undissolved Polymer | Undissolved Polymer |
| 5D | Ethylene Glycol | Undissolved Polymer | Undissolved Polymer |

As can be seen from the foregoing table, only the dipropylene glycol test resulted in a polymer solution suitable for spinning into fibers. The dioxane test appears to have resulted in a solution at 60°C. which, were it not for the severe thermal degradation (color formation) at this temperature over prolonged periods needed for spinning, might have been spinable. The other two tests resulted in materials which were not suitable for spinning into fibers. In further tests, it was determined that, at the sodium thiocyanate concentration in this example, as little as 10% dipropylene glycol on weight of solvent satisfactorily dissolved this specific polymer.

We claim:

1. An aqueous solvent for acrylonitrile polymers containing 55 to 80% acrylonitrile and 15 to 40% halogencontaining comonomer comprising at least one of vinyl chloride, vinylidene chloride, vinylidene chlorobromide, vinyl bromide, and vinylidene bromide, said solvent comprising an aqueous solution of at least 30% on weight of solvent of sodium thiocyanate and 2% to 25% on weight of solvent of dipropylene glycol.

2. A composition as defined in claim 1 wherein the concentration of sodium thiocyanate is between 40 and 55% on weight of solvent.

3. An acrylonitrile polymer solution comprising 8 to 15% of acrylonitrile polymer containing 55 to 80% acrylonitrile and 15 to 40% of halogen-containing comonomer comprising at least one of vinyl chloride, vinylidene chloride, vinylidene chlorobromide, vinyl bromide, and vinylidene bromide dissolved in a solvent comprising an aqueous solution of at least 30% on weight of solvent of sodium thiocyanate and 2 to 25% on weight of solvent of dipropylene glycol.

4. A composition as defined in claim 3 wherein the concentration of sodium thiocyanate is between 40 and 55% on weight of solvent.

5. A process for forming fibers comprising wet-spinning an acrylonitrile polymer solution as defined in claim 3.

6. A process as defined in claim 5 wherein said polymer solution contains 10 to 13% acrylonitrile polymer and the concentration of sodium thiocyanate is between 40 and 55% on weight of solvent.

* * * * *